(12) United States Patent
Kamp et al.

(10) Patent No.: US 11,394,726 B2
(45) Date of Patent: Jul. 19, 2022

(54) METHOD AND APPARATUS FOR TRANSMITTING A MESSAGE SEQUENCE OVER A DATA BUS AND METHOD AND APPARATUS FOR DETECTING AN ATTACK ON A MESSAGE SEQUENCE THUS TRANSMITTED

(71) Applicant: Volkswagen Aktiengesellschaft, Wolfsburg (DE)

(72) Inventors: Birger Kamp, Rotgesbuttel (DE); Viktor Bunimov, Vechelde (DE); Anke Jentzsch, Tiddische (DE); Steven Michna, Berlin (DE); Christoph Riechel, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 725 days.

(21) Appl. No.: 16/155,466

(22) Filed: Oct. 9, 2018

(65) Prior Publication Data
US 2019/0109867 A1    Apr. 11, 2019

(30) Foreign Application Priority Data
Oct. 11, 2017    (DE) ...................... 10 2017 218 134.6

(51) Int. Cl.
*H04L 12/40* (2006.01)
*G06F 13/36* (2006.01)
*H04L 9/40* (2022.01)

(52) U.S. Cl.
CPC .......... *H04L 63/1416* (2013.01); *G06F 13/36* (2013.01); *H04L 12/40* (2013.01);
(Continued)

(58) Field of Classification Search
None
See application file for complete search history.

(56) References Cited

U.S. PATENT DOCUMENTS

| | | | |
|---|---|---|---|
| 9,420,530 B1 * | 8/2016 | Duxbury | H04W 52/02 |
| 2006/0156127 A1 * | 7/2006 | Harter | H04L 1/0041 |
| | | | 714/732 |

(Continued)

FOREIGN PATENT DOCUMENTS

| | | | |
|---|---|---|---|
| CN | 102354305 A | 2/2012 | G06F 1/32 |
| CN | 106274307 A | 1/2017 | B60C 23/04 |

(Continued)

OTHER PUBLICATIONS

Larson, Ulf E. et al., "An Approach to Specification-Based Attack Detection for In-Vehicle Networks," IEEE Intelligent Vehicles Symposium, Eindhoven University of Technology, p. 220-225, Jun. 4, 2008.

(Continued)

*Primary Examiner* — Jeffrey Nickerson
(74) *Attorney, Agent, or Firm* — Slayden Grubert Beard PLLC

(57) ABSTRACT

The present invention relates to a method for transmitting a message sequence via a data bus. The method comprises the transmission of an informational message containing an informational signal during an active phase, the transmission of a security message for initiating a rest phase and the transmission of rest messages containing a rest signal at the interval of a rest cycle time during the rest phase, wherein the informational signal and the rest signal differ from each other and wherein the security message and the rest messages differ from each other. Furthermore, the invention relates to a device for transmitting a message sequence via (Continued)

a data bus as well as a method and a device for detecting an attack on a message sequence transmitted via a data bus.

10 Claims, 5 Drawing Sheets

(52) U.S. Cl.
CPC ............... *H04L 12/40039* (2013.01); *H04L 2012/40215* (2013.01); *H04L 2012/40267* (2013.01); *H04L 2012/40273* (2013.01); *Y02D 30/50* (2020.08)

(56) References Cited

U.S. PATENT DOCUMENTS

| | | | |
|---|---|---|---|
| 2014/0200687 A1 | 7/2014 | Stegmaier et al. | 700/79 |
| 2015/0033016 A1 | 1/2015 | Thornton et al. | 713/171 |
| 2015/0066239 A1 | 3/2015 | Mabuchi | 701/1 |
| 2015/0106540 A1* | 4/2015 | Hoffmann | G06F 13/4221 710/107 |
| 2015/0172306 A1 | 6/2015 | Kim et al. | 726/23 |
| 2015/0358351 A1 | 12/2015 | Otsuka et al. | 726/23 |
| 2016/0146710 A1 | 5/2016 | Nair | 702/183 |
| 2016/0188396 A1 | 6/2016 | Sonalker et al. | 714/37 |
| 2016/0308887 A1 | 10/2016 | Jung et al. | 726/23 |
| 2017/0026386 A1 | 1/2017 | Unagami et al. | 726/1 |
| 2017/0126711 A1 | 5/2017 | Jung et al. | 726/23 |
| 2018/0115575 A1 | 4/2018 | Hartkopp et al. | |
| 2021/0067523 A1* | 3/2021 | Kamp | H04L 63/1425 |

FOREIGN PATENT DOCUMENTS

| | | | |
|---|---|---|---|
| DE | 102011102274 B4 | 12/2012 | ........... G05B 19/048 |
| DE | 102015205670 A1 | 6/2016 | ............ H04L 12/26 |
| EP | 3133774 A1 | 2/2017 | ........... B60R 16/023 |
| EP | 3142291 A1 | 3/2017 | ........... B60R 16/023 |
| EP | 3282646 A1 | 2/2018 | ............ H04L 12/40 |
| RU | 2256274 C1 | 7/2005 | ............... H02J 3/46 |
| WO | 2016/151566 A1 | 9/2016 | ............ G06F 12/14 |
| WO | 2016/156034 A1 | 10/2016 | ............ H04L 12/40 |

OTHER PUBLICATIONS

Chinese Office Action, Application No. 201811182654.5, 7 pages, dated Nov. 3, 2020.

German Office Action, Application No. 102017218134.6, 8 pages, dated Jul. 2, 2018.

* cited by examiner

US 11,394,726 B2

METHOD AND APPARATUS FOR TRANSMITTING A MESSAGE SEQUENCE OVER A DATA BUS AND METHOD AND APPARATUS FOR DETECTING AN ATTACK ON A MESSAGE SEQUENCE THUS TRANSMITTED

CROSS-REFERENCE TO RELATED APPLICATIONS

This application claims priority to German Patent Application DE 10 2017 218 134.6, which German Patent Application was filed on Oct. 11, 2017 with the German Patent and Trademark Office, the contents of which application are hereby incorporated by reference for all purposes.

TECHNICAL FIELD

The invention relates to a method and a device for transmitting a message sequence via a data bus, for example a CAN bus in a motor vehicle. Furthermore, the invention relates to a method and a device for detecting an attack on a message sequence transmitted via a data bus, in particular a CAN bus.

With the increasing interconnectedness of motor vehicles, there is an increasing need to make attacks more difficult and to detect them in the case of a data transmission within a bus system of a motor vehicle and to detect as well as to avoid a manipulation of components of the bus system communicating with each other via a data bus.

For this reason, several attack detection methods have already been developed. For example, US 2015/0172306 A1 describes a method for securely transmitting signals in a vehicle communication network, wherein hacked messages are detected based on a comparison of a running mean for a transmission interval with a specified value. EP 3 133 774 A1 describes a method for detecting hacker messages depending on cycle times.

WO 2016/156034 A1 describes a further attack detection method for a bus system. Hacker attacks are thereby detected by means of communication rules, which relate to a message transmission cycle, a blocking time and the like.

SUMMARY

As the present inventors have ascertained, with the known method, a monitoring of certain CAN bus signal send types, such as for example IfActive signal send types or other related signal send types, are successful, however only to a limited degree due to the underlying send concept.

A need thus exists to provide a method and a device for transmitting a message sequence via a data bus as well as a method and a device for detecting an attack on a message sequence transmitted via a data bus, which at least partially overcome the aforementioned disadvantages.

This need is addressed by the discussed method for transmitting a message sequence via a data bus as claimed, the device for transmitting a message sequence via a data bus as claimed, the method for detecting an attack on a message sequence transmitted via a data bus as claimed, and the device for detecting an attack on a message sequence transmitted via a data bus as claimed.

A first aspect relates to a method for transmitting a message sequence via a data bus, comprising:
transmission of an informational message containing an informational signal during an active phase; transmission of a security message for initiating a rest phase; and transmission of rest messages containing a rest signal at the interval of a rest cycle time during the rest phase, wherein the informational signal and the rest signal differ from each other and wherein the security message and the rest messages differ from each other.

A second aspect relates to the transmission of a message sequence via a data bus, which has a circuit, which is designed to execute a method for transmitting a message sequence via a data bus according to the first aspect.

A third aspect relates to a method for detecting an attack on a message sequence transmitted via a data bus, in particular on a message sequence transmitted by means of a method for transmitting a message sequence via a data bus according to the first aspect, comprising:
receiving the message sequence transmitted via the data bus; checking whether a rest phase, during which rest messages are transmitted at the interval of a rest cycle time, is initiated with a specified security message, wherein the specified security message and the rest messages differ from each other; and
detecting an attack if the rest phase is not initiated with the specified security message.

A fourth aspect relates to a device for detecting an attack on a message sequence transmitted via a data bus, which has a circuit, which is designed to execute a method for detecting an attack on a message sequence transmitted via a data bus according to the third aspect.

BRIEF DESCRIPTION OF THE DRAWINGS

The invention is explained in the following using exemplary embodiments.

In the figures.

Figure 1:
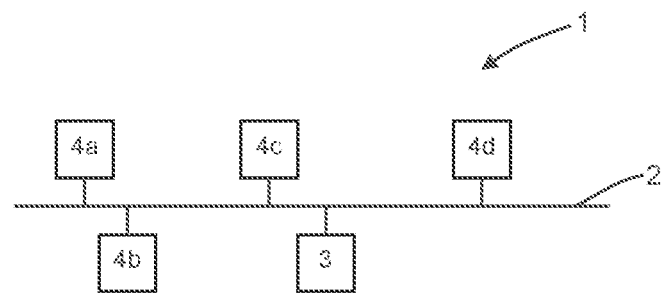
FIG. 1 shows schematically an exemplary embodiment of a bus system with several bus components connected via a data bus.

Further advantageous embodiments result from the dependent claims and the following description of preferred exemplary embodiments of the present invention.

One exemplary aspect relates to a method for transmitting a message sequence via a data bus. The message sequence to be transmitted via the data bus may in some embodiments follow one of the following signal send types IfActive, IfActiveWithRepetition or a comparable signal send type, which are described in detail further below. These signal send types are suited for quickly transmitting information, since the active phase, in which information can be transmitted, can be initiated at any time. The data bus may be a data bus of a bus system, for example, a serial bus, e.g., like a CAN bus. The bus system can be a bus system of a motor vehicle, a railway vehicle, a motor-operated water vehicle, an airplane, a plant, a machine or the like.

According to the present aspect, during an active phase, an informational message containing an informational signal is transmitted, wherein the informational signal represents a command to be transmitted, a message to be transmitted or data to be transmitted. The command to be transmitted may in some embodiments be a control command to a component of the bus system. For example, the command can be a request to a component of the bus system to work in a specified manner, for example a request to activate or deactivate the component, to retain a status or to change a status of a component or the like. The data to be transmitted may contain sensor signals or other status information.

Furthermore, according to the method according to the present aspect, a security message for initiating a rest phase is transmitted. The security message can have a specified content, which is described in detail further below.

According to the present aspect, after the transmission of the security message, rest messages, which contain a rest signal, may in some embodiments then be transmitted during the rest phase at the interval of a rest cycle time. The rest signal may in some embodiments be a specified signal, which may in some embodiments be the same for all rest messages. The rest signal may in some embodiments differ from the informational signal of the informational messages transmitted during the active phase. Furthermore, the security message and the rest messages differ from each other. In particular, a signal contained in the security message may differ from the rest signal and/or a value of the signal contained in the security message differs from a value of the rest signal.

The respective messages may first be generated by a component of the bus system and then output by this component for transmission to the data bus. Each message may have a message header and/or a message end, each of which has data for "managing" the message. Additionally, the message may in some embodiments have a data part containing the signals of the message, i.e., the informational signal in the informational message and the rest signal in the rest message.

A targeted adjustment of a send behavior of the signal or respectively the message sequence to be transmitted through the use of the security message enables the detection of additionally infiltrated messages, i.e., the detection of attacks on the message sequence to be transmitted via the data bus, which is transmitted in particular by means of one of the signal send types named above.

The present aspect safeguards the use of signals of signal send types IfActive, IfActiveWithRepetition or comparable signal send types in security-relevant areas that depend on high data security, for example in automation technology, elevators, medical technology, flight engineering, aerospace technology, railway vehicles, shipbuilding, pyrotechnics, and/or in comparable fields.

During the active phase, one or more informational messages may be transmitted. If only one informational message is transmitted, it may be transmitted after a rest message at any point in time, which lies however before completion of the rest cycle time.

In some exemplary embodiments, during the active phase, two or more informational messages can be transmitted at the interval of an information transmission cycle time, which is shorter than the rest cycle time.

In the rest state, rest messages may thus be sent with the rest cycle time. As soon as an event occurs in the component of the bus system outputting the message sequence, for example in a control unit, this component can initiate the active phase outside of the rest cycle time in that it sends one or more informational messages with an informational transmission cycle time. As soon as the informational messages are transmitted, this component can transmit the security message and subsequently rest messages with the rest cycle time.

The value of the rest signal of the rest message in some embodiments differs from the values of the informational signals of the informational messages in the active phase. The value of the rest signal, the rest cycle time, the information transmission time, a value of the security message and further signal transmission conditions can be saved for the entire bus system, for example in a central data storage unit or in one or more data storage units of the components of the bus system.

In some exemplary embodiments, the security message can have a signal, which corresponds with an informational signal of one of the informational messages, which were transmitted during the active phase directly preceding the rest phase. The security message may in some embodiments have a value, which corresponds with a value of the informational signal of one of the informational messages, which were transmitted during the active phase directly preceding the rest phase. If only one informational message is transmitted during the active phase, a message with the informational signal of the informational message of this active phase can be transmitted for example as the security message to end the active phase and initiate the rest phase. If two or more informational messages are transmitted during the active phase, a message with the informational signal of one of the informational messages can be transmitted for example as the security message.

In some exemplary embodiments, the security message may have a signal, which corresponds with the informational signal of the informational message, which was last transmitted during the active phase directly preceding the rest phase. Alternatively and in some embodiments, the security message may have a signal, which corresponds with the informational signal of the informational message, which was transmitted during the active phase directly preceding the rest phase first or between the first and the last informational messages of the active phase.

Alternatively and in some embodiments, the security message can also have a value, which is determined in advance. For example, a value of the security message can be constant and differ from the values of the informational messages and the rest messages.

An interval of the security message to a directly subsequent rest message may in some embodiments correspond with a rest cycle time. Thus, a message sequence can thus contain at least one informational message, a security message, which follows the informational message at an interval that is less than the rest cycle time, and at least one rest message, which follows the security message at an interval that corresponds with the rest cycle time. This message sequence may enable an effective monitoring of signal send types, for example IfActive, IfActiveWithRepetition or a comparable signal send type.

In some exemplary embodiments, a message containing the rest signal can be transmitted during the rest phase after the transmission of the security message at an interval that is less than the rest cycle time. The interval between the security message and the rest message containing the rest signal can correspond with the information transmission cycle time. A further rest message may then follow at an interval that is selected such that an interval between the security message and the further rest message corresponds with the rest cycle time.

In some exemplary embodiments, the message sequence to be transmitted via the data bus can be transmitted with a certain signal send type, for example the signal send type IfActive or IfActiveWithRepetition.

In the case of an IfActive signal, messages may in some embodiments be sent in the rest state with a certain predetermined signal (rest signal) and a long cycle time (rest cycle time). If an event occurs that needs to be directly transmitted from a sender, for example a sending control unit, to one or more recipients in the bus system, the sending control unit can transmit the informational signal outside of the long cycle time. Thus, an active message (informational message) may be sent at (almost) any point in time. After the active phase is complete, the sending control unit goes back to the rest state and sends rest messages with a long cycle time. If several informational messages follow directly in succession, they are sent with a predetermined, short cycle time (information transmission cycle time). The content of the active messages thereby in some embodiments differ from that of the rest messages.

In the case of a message sequence with the signal send type IfActiveWithRepetition, a certain number of rest messages with a fast cycle time (repetition) may in some embodiments be sent after each active phase, for example two or three or even a plurality of rest messages.

Alternatively and in some embodiments, the message sequence to be transmitted via the data bus can be transmitted with one of the signal send types OnChangeAndIfActive, OnChangeAndIfActiveWithRepetition, OnWrite, OnWriteAndIfActiveWithRepetition.

The named signal send types are particularly suited to quickly transmit information and/or commands, in particular faster than when adhering to a typical cycle time, for example a cyclical signal send type, which takes for example 1000 ms or more.

In some exemplary embodiments, the informational message and the rest message can each have an additional informational signal, which is an informational signal of a message sequence, which is transmitted with a signal send type, which differs from a signal send type of the message sequence to be transmitted via the data bus. For example, a first message sequence with a first signal send type and a second message sequence with a second signal send type, which differs from the first signal send type, are transmitted by means of common messages via the data bus. The first signal send type may be IfActive or one of the aforementioned comparable signal send types and the second signal send type may be a cyclical signal send type, in which the messages are transmitted for example in a cycle time corresponding with the rest cycle time of the first signal send type. The first signal send type may be a dominant signal send type, which stamps its time response on the second signal of the second signal send type. That is to say, the informational signal of the second message sequence is in particular not only transmitted cyclically at intervals of the rest cycle time, but rather additionally also at points of time when the informational signals of the first message sequence are transmitted during the active phase. For example, a message having the rest signal of the first message sequence may also have the informational signal of the second message sequence, and the informational message of the first message sequence can also have the informational signal of the second message sequence. Thus, different signal send types can occur within a message, wherein a dominant signal send type stamps its time response on other signals. The other signals in some embodiments follow and can contain the values just received from the sending control unit. Accordingly, further signals with other signal send types can be transmitted in parallel.

If several signals of different signal send types are transmitted in joint messages, a rest phase of the dominant signal may be initiated by transmitting the security message, in order to prevent an attack on the transmitted message sequence or to be able to detect an attack.

A further aspect relates to a device for transmitting a message sequence via a data bus, which has a circuit, which is designed to transmit an informational message containing an informational signal during an active phase, to transmit a security message for initiating a rest phase and to transmit rest messages containing a rest signal at an interval of a rest cycle time during the rest phase, wherein the informational signal and the rest signal differ from each other and wherein the security message and the rest messages differ from each other. The circuit is thus designed to execute a method for transmitting a message sequence via a data bus as was described in detail above. The circuit may in some embodiments be a processor or a communication chip (transceiver).

The device may in some embodiments be a component of a bus system, which is designed to output one or more message sequences with messages with informational signals, which contain a command to be transmitted, in particular commands for one or more other components of the bus system, represents a message to be transmitted or data to be transmitted, for example a sending control unit. For example, the sending control unit may be an engine control of a motor vehicle. Alternatively, the control unit can be a control unit of a railway vehicle, a motor-operated water vehicle, an airplane, a plant, a machine or the like.

The device may have a signal output, which is designed to connect the device with the data bus, for example by means of a plug connection.

The device may have a data storage unit, in which information on the signal transmission is saved. The information may comprise for example values of the rest cycle time and/or of the information transmission cycle time, the value of the rest signal, a number of rest messages in an IfActiveWithRepetition and/or further information on the signal transmission. Furthermore, rule and/or control algorithms can be saved in the data storage unit, by means of which the circuit can generate the message sequence to be transmitted via the data bus.

A further aspect relates to a method for detecting an attack on a message sequence transmitted via a data bus. The message sequence may contain an informational message containing an informational signal, which is transmitted during an active phase, a security message, through which a rest phase is initiated, and rest messages containing a rest signal, which are transmitted at the interval of a rest cycle time during the rest phase. The message sequence may be in particular a message sequence transmitted by means of the method described above for transmitting a message sequence via a data bus.

According to the present method for detecting an attack, the message sequence transmitted via the data bus is received. It may then be checked whether a rest phase, while the rest messages are transmitted at the interval of a rest cycle time, is initiated with a specified security message, wherein the specified security message and the rest messages differ from each other. If the rest phase is not initiated with a specified security message, an attack is detected.

The specified security message may have an informational signal of one of the informational messages, which was transmitted during the active phase directly preceding the rest phase, in some embodiments of an informational message, which was last transmitted during the active phase directly preceding the rest phase. The informational signal serving as the basis for the security message of the informational message of the active phase is in some embodiments buffered in a data storage unit. To check whether the security message corresponds with a specified security message, the transmitted security message, in particular a value of the transmitted security message, may be compared with the specified security message or respectively with its value.

Depending on the result of the comparison, it can be detected whether an attack was carried out on the transmitted message sequence. If the security message corresponds with the specified security message, it can be determined that an attack was not carried out on the message sequence. Otherwise, it can be determined that an attack was carried out on the transmitted message sequence.

As a result of a detected attack, an error message can be generated and output to a user, for example as an alarm or the like. Alternatively, the message sequence can be requested again.

The present explanation further relates to a device for detecting an attack on a message sequence transmitted via a data bus, which has a circuit, which is designed to receive the message sequence transmitted via the data bus, to check whether a rest phase, while the rest messages are transmitted at an interval of a rest cycle time, is initiated with a specified security message, wherein the specified security message and the rest messages differ from each other and to detect an attack if the rest phase is not initiated with the specified security message. The circuit is thus designed to execute a method for detecting an attack on a message sequence transmitted via a data bus as was described in detail above. The circuit can be a processor or a communication chip (transceiver), for example.

The device may be a component of a bus system, which is designed to receive one or more message sequences with messages with informational signals, which represent a command, a message or data for the device. For example, the device can be an ABS control, an electronic stability control, a door and/or window control, a control for an illumination apparatus and/or a windshield wiper apparatus, a navigation unit, a CD player, a display instrument, an infotainment system and/or another component of the bus system.

The device may have a signal input, which is designed to connect the device with the data bus, for example by means of a plug connection. Furthermore, the device can have a signal output.

The device may have a data storage unit, in which information for detecting an attack on the transmitted message sequence is saved. The information may correspond with the information described above for the signal transmission. Furthermore, rule and/or control algorithms can be saved in the data storage unit, by means of which the circuit can convert the content transmitted via the data bus.

The circuit of the device for detecting an attack may furthermore be designed to execute the method described above for transmitting a message sequence via a data bus.

Further embodiments will now be described in further exemplary embodiments with reference to the attached drawings.

An exemplary embodiment of a CAN bus system 1 is shown schematically in FIG. 1.

The CAN bus system 1 here has for example a power train (CAN bus) 2, on which an engine control 3 and a plurality of bus components are arranged. An anti-lock braking system control unit (ABS control unit) 4a, a navigation unit 4b, a light switch 4c, and a control unit for the electronic stability control 4d are shown as examples of bus components in FIG. 1. The message sequences transmitted via the CAN bus 2 can contain signals of different signal send types.

The engine control and the bus components may alternatively be arranged on different power trains of the CAN bus system, which are connected via a Gateway control unit.

In one exemplary embodiment, the message sequence transmitted via the CAN bus 2 is a message sequence with the so-called signal send type IfActive. Thus, the signal send type IfActive is first explained below in its conventional form and an attack scenario on this conventional form is described.

Figure 2:
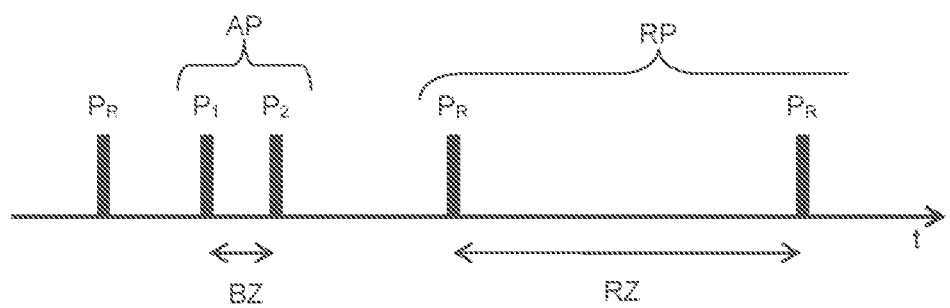
FIG. 2 shows a conventional message sequence of an IfActive signal with a regular informational message.

As shown in FIG. 2, a message sequence of the signal send type IfActive has an active phase AP and a rest phase RP. During the active phase AP, informational messages $P_1$, $P_2$ containing an informational signal are sent with an information transmission cycle time BZ, wherein the informational signal represents a command to be transmitted. The number of the informational messages $P_1$, $P_2$ during the active phase AP can vary and differ in particular from two. During the rest phase RP, rest messages $P_R$ containing a rest message are sent with a rest cycle time RZ, wherein the rest signal is determined in advance as an inactivity condition. The rest cycle time RZ is thereby considerably longer than the information transmission cycle time BZ. In the present case, the rest cycle time RZ is approximately 5 times the information transmission cycle time BZ. As shown in FIG. 2, the rest phase RP begins immediately after an active phase AP with a rest message $P_R$. The informational signals of the informational messages $P_1$, $P_2$ differ from the rest signal of the rest messages $P_R$.

Figure 3:
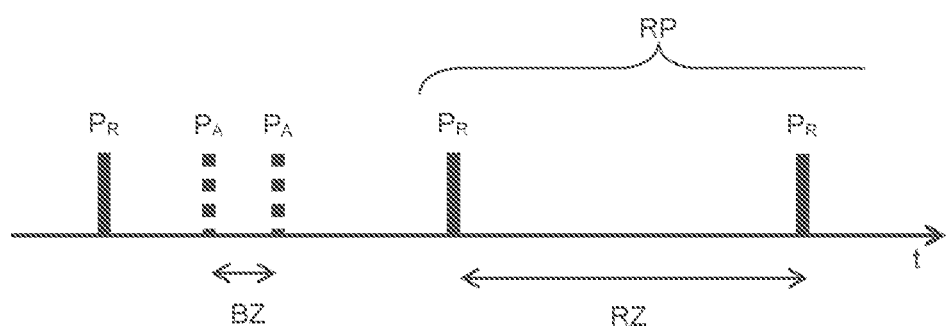
FIG. 3 shows a conventional message sequence of an IfActive signal with a message infiltrated within the framework of an attack.

If an attacker notices the inactivity condition and the blocking time or respectively the rest cycle time RP, they can introduce unnoticed additional messages $P_A$ between two rest message $P_R$, as shown in FIG. 3. These additional infiltrated messages $P_A$ cannot be detected by a monitoring system since they match a regular message sequence.

Infiltrated messages cannot be discovered by a detection system in the described conventional message sequence of the signal send type 'IfActive' by a simple monitoring of the time response if all requirements relating to time responses and signal content are met because they then do not differ from a regular informational message.

Thus, the sending flow of an IfActive signal is modified in a first exemplary embodiment of the present aspect. The modified IfActive signal is transmitted according to the method 5 shown in FIG. 4 for transmitting a message sequence via a CAN bus. The method 5 for transmitting a message sequence is executed here for example by the engine control 3. It can however also be executed by other bus components.

Figure 5:
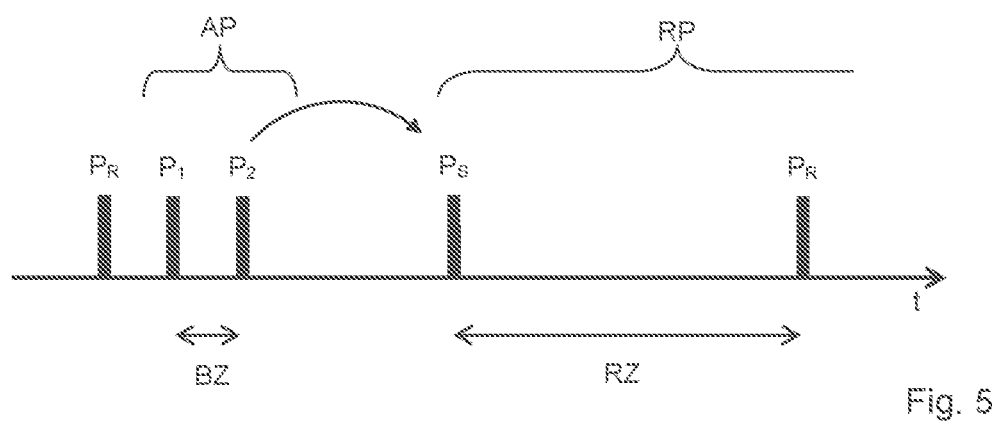
FIG. 5 shows a message sequence of an IfActive signal with a regular informational message.

At 50, two informational messages $P_1$ and $P_2$ are transmitted at an interval of the information transmission cycle time BZ during an active phase AP, as shown in FIG. 5. For example, the signal should be transmitted to the ABS control unit 4a after a sudden braking action is detected. The informational message $P_1$ then contains an informational signal with a request to the ABS control unit to reduce the brake pressure to prevent the wheels from locking. The informational message $P_2$ contains an informational signal with a specification regarding the brake pressure to be set. Depending on the situation, the message sequence can also contain information for all other bus components, i.e. not just for the ABS control unit 4a.

Subsequently, at 51, a security message $P_2$ for initiating a rest phase RP is transmitted, as shown in FIG. 5. This security message $P_S$ contains as a value the value of the informational signal of the directly preceding informational message $P_2$, i.e. here a value, which represents the specification regarding the brake pressure to be set.

At 52, rest messages $P_R$ are then transmitted during the rest phase RP at the interval of a rest cycle time RZ, wherein an interval of the first rest message $P_R$ matches the safety message $P_S$ of the rest cycle time RZ. The rest signal of the rest messages is determined in advance and differs from the informational signals of the informational messages $P_1$, $P_2$ and the security message $P_S$.

Consequently, a message sequence is generated and transmitted, as shown in FIG. 5. The uniqueness is the changed sending sequence: Upon completion of an active phase AP, the subsequent rest phase RP begins with a security message $P_S$, in the case shown in FIG. 5 with the value of the last message of the active phase AP. The subsequent rest message $P_R$ has an interval of a long cycle time RZ to this security message $P_S$. Since the security message $P_S$ marks the start of the subsequent rest phase RP, the security message $P_S$ in this description is also called the security mark.

Figure 6:
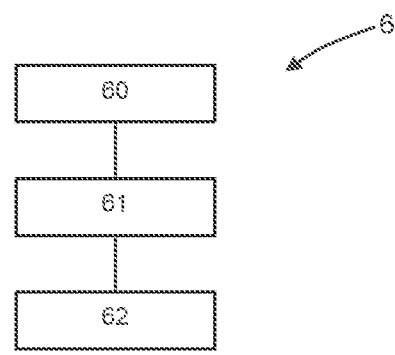
FIG. 6 shows a flow chart of a method for detecting an attack on a message sequence transmitted via the data bus of the bus system shown in FIG. 1.

The message sequence described referring to FIG. 5 makes it possible to reliably detect infiltrated messages during the signal transmission. A method 6 for detecting an attack on a message sequence transmitted via the CAN bus is described below referring to FIG. 6. The method is executed by the bus component, for which the message sequence is determined, here by an ABS control unit 4a. The method for detecting an attack can however also be executed by another bus component, which receives the message sequence.

The message sequence transmitted via the CAN bus is received at 60. The transmitted message sequence is based on the message sequence described referring to FIG. 5, but can contain additionally infiltrated messages.

At 61, it is checked whether the rest phase RP, during which the rest messages $P_R$ are transmitted at an interval of a rest cycle time RZ, is initiated with a specified security message. It is also checked whether, at the start of the rest phase RP, the security message $P_S$, the value of which matches the informational signal of the informational message $P_2$, was transmitted at an interval of the rest cycle time RZ followed by a rest message $P_R$.

At 62, an attack is detected if the rest phase RP is not initiated with the specified security message. Thus, if a rest message $P_R$ immediately follows the active phase AP, i.e. the security message $P_S$ is missing, this indicates an infiltrated message. In this manner, it is possible to successfully detect infiltrated messages, since it is not possible to readily intervene in the regular time response during an attack without violating time requirements. Infiltrated messages, which are appended to the active phase AP, can also be discovered. If the last message $P_2$ of the active phase AP differs from the security message $P_S$, there is an attack. Effective protection against infiltrated messages is thus obtained from the described modification of the sending flow.

In a second exemplary embodiment, the message sequence transmitted via the CAN bus is a message sequence with the so-called signal send type IfActiveWithRepetition. Thus, the signal send type IfActiveWithRepetition is first explained below in its conventional form and an attack scenario on this conventional form is described.

Figure 7:
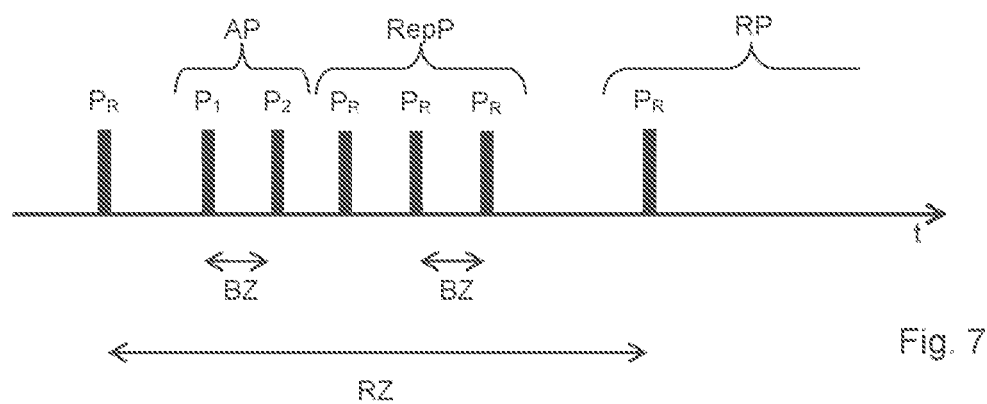
FIG. 7 shows a conventional message sequence of an IfActiveWithRepetition signal with a regular informational message.

As shown in FIG. 7, a message sequence with the signal send type IfActiveWithRepetition has an active phase AP, a repetition phase RepP and a rest phase RP. During the active phase AP, informational messages $P_1$, $P_2$ containing an informational signal are sent with an information transmission cycle time BZ. The active phase AP is followed by the repetition phase RepP, during which three rest messages $P_R$, each of which contain the rest signal, are sent with an information transmission cycle time BZ. The number of rest messages $P_R$ during the rest phase RepP can also differ from three; it is however determined in advance. During the rest phase RP, the rest messages $P_R$ containing the rest signal are sent with a rest cycle time RZ. As shown in FIG. 2, the rest phase RP begins immediately after a repetition phase RepP with a rest message $P_R$.

Figure 8:
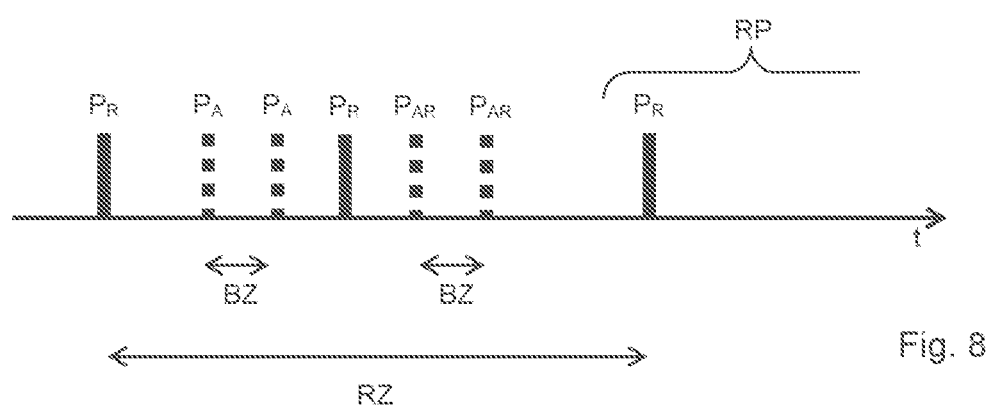
FIG. 8 shows a conventional message sequence of an IfActiveWithRepetition signal with a message infiltrated within the framework of an attack.

Even in the case of the IfActiveWithRepetition signal send type, an attacker can infiltrate unnoticed additional messages $P_A$ between two rest messages $P_R$, if they infiltrated two additional rest messages $P_{AR}$ at an interval of the information transmission cycle time BZ between two subsequent rest messages $P_R$, as shown in FIG. 8. These additional messages $P_A$ and $P_{AR}$ cannot be detected by a monitoring system since they match a regular message sequence.

In the case of signal send type 'IfActiveWithRepetition', a certain number of rest messages $P_R$ with fast cycle time BZ (repetition) is thus sent after each active phase AP. Also in the case of this signal send type, infiltrated messages $P_A$, $P_{AR}$ cannot be detected if the infiltrated part matches all requirements (inhibit time, fast cycle time and number of repetitions) and is correctly placed between two successive rest messages $P_R$.

Figure 9:
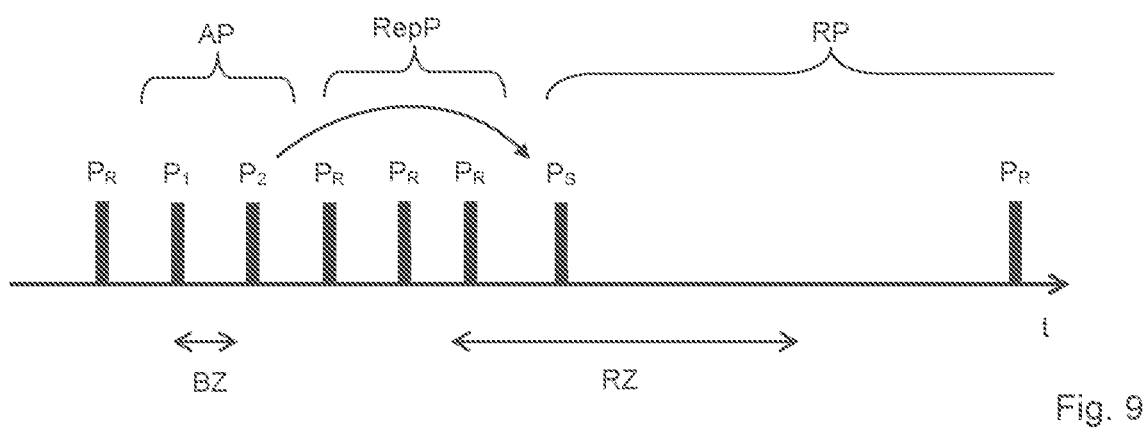
FIG. 9 shows a message sequence like mentioned of an IfActiveWithRepetition signal with a regular informational message.

Thus, the sending flow of an IfActiveWithRepetition signal is modified in the second exemplary embodiment like mentioned, as shown in FIG. 9. The message sequence in FIG. 9 shows an active phase AP with the two informational messages $P_1$, $P_2$ at an interval of the information transmission cycle time BZ. The active phase AP is followed by a repetition phase RepP with three rest messages $P_R$ at an interval of the information transmission cycle time BZ. After the repetition phase RepP, the rest phase RP is initiated by a security message $P_S$, the value of which matches the value of the informational signal of the last informational message $P_2$ of the active phase AP. The security message $P_S$ is followed at an interval of the rest cycle time RZ by rest messages $P_R$, which are in turn transmitted with the rest cycle time RZ.

Figure 4:
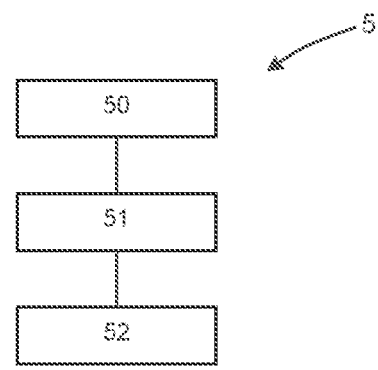
FIG. 4 shows a flow chart of a method for transmitting a message sequence via the CAN bus of the bus system shown in FIG. 1.

To transmit the message sequence, the method 5 for transmitting a message sequence via a CAN bus described referring to FIG. 4 is used in an analogous manner. Three rest messages $P_R$ are thereby transmitted at an interval of the information transmission cycle time BZ only between the transmission of the last informational message $P_2$ during the active phase AP and the security message $P_S$. The method for detecting an attack described above referring to FIG. 6 is also used analogously.

Figure 10:
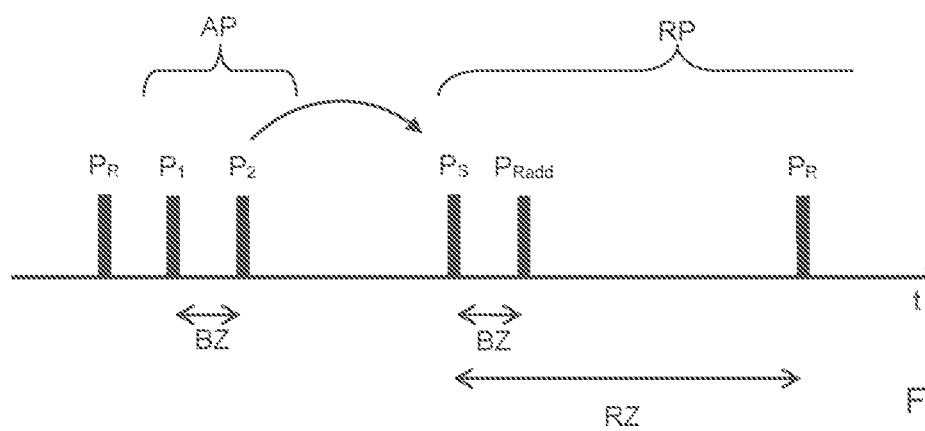
FIG. 10 shows a further message sequence of an IfActive signal with a regular informational message and an attached regular rest message.

FIG. 10 shows a message sequence according to a third exemplary embodiment. The message sequence differs from the message sequence shown in FIG. 5 only in that an additional rest message $P_{Radd}$, which contains the rest signal, is transmitted after the security message $P_S$ at an interval of the information transmission cycle time BZ. The security message $P_S$ can thereby be detected as such more reliably and unwanted conditions or respectively reactions in the receiver/control unit are prevented.

Instead of an additional rest message $P_{Radd}$, several additional rest messages $P_{Radd}$ can also be transmitted.

Accordingly, the message sequence of the IfActiveWithRepetition signal send type in FIG. 9 can also be enhanced with one or more additional rest messages $P_{Radd}$ at a short interval BZ after the security message $P_S$.

According to a fourth exemplary embodiment, the security mark of the message sequence shown in FIG. 5 is to be provided in such a manner that it is still suited for monitoring and can simultaneously be detected by the receiver unit as the start of the rest phase RP.

The security message $P_S$ of the message sequence of the IfActiveWithRepetition signal send type in FIG. 9 can be designed accordingly.

The described methods can be used not only on individual signals within a message but also on complete messages. In a fifth exemplary embodiment, a secure transmission option of messages with mixed signal send types is thus described referring to FIG. 11.

Figure 11:
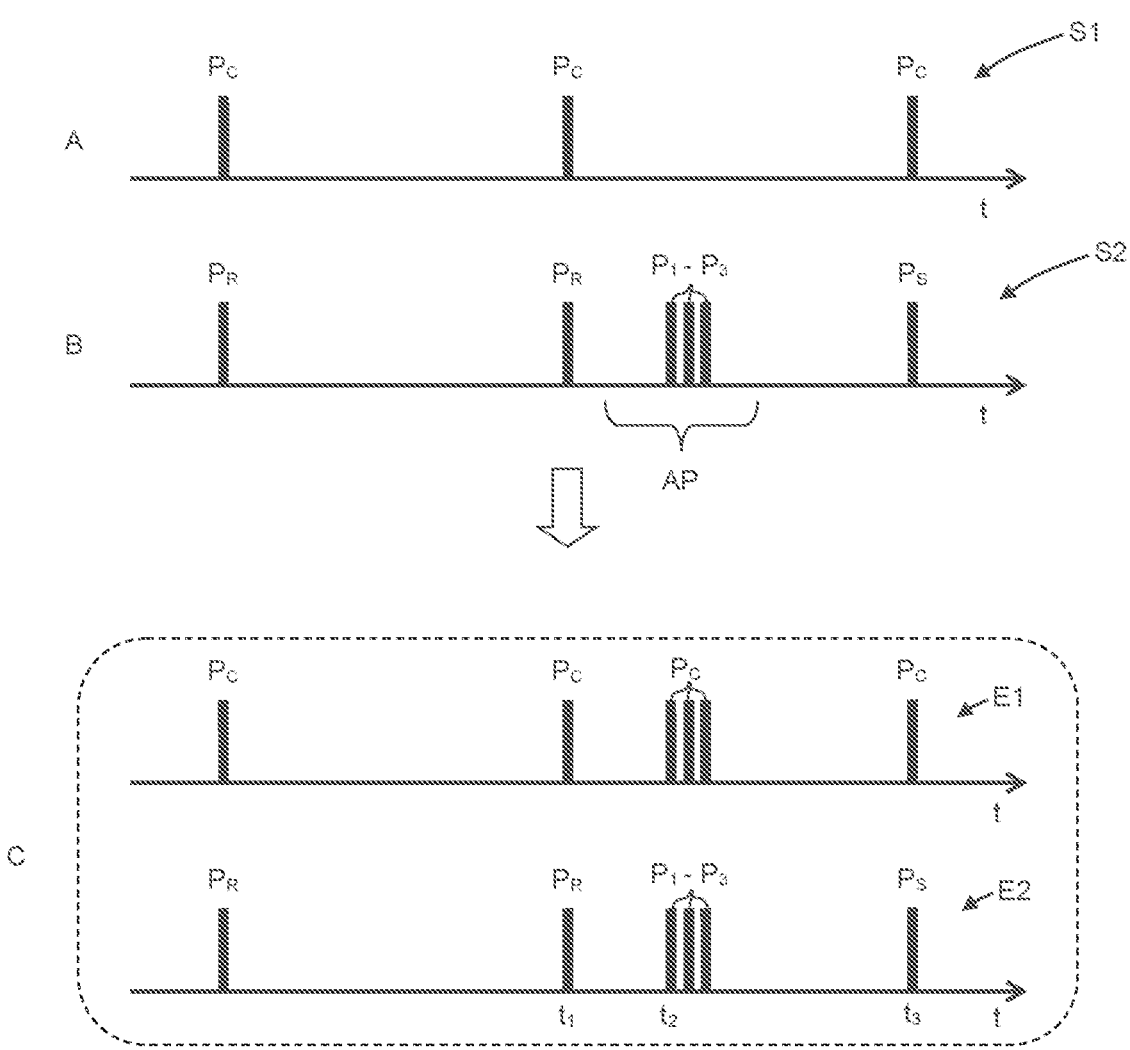
FIG. 11 shows message sequences of two signals transmitted in parallel with different signal send types and FIG. 12 shows a structure of a message made up of signals with different signal send types.

FIG. 11 shows at A a first message sequence S1, according to which messages $P_C$ are transmitted cyclically and at B a second message sequence S2 of the signal send type IfActive, according to which rest messages $P_R$ are transmitted simultaneously with the messages $P_C$ of the first message sequence S1 and informational messages $P_1$ to $P_3$ between two rest messages as well as the security message $P_S$, which matches the informational message $P_3$, are transmitted.

This results in a message sequence, which has messages with both signal send types, as shown by C in FIG. 11. Since the signal send type IfActive is a dominant signal send type, the second message sequence S2 stamps its time response to the first message sequence S1. The second message sequence S2 follows and contains the values just received from a control unit, for example the engine control. The resulting message sequence thus comprises, as shown by C in FIG. 11, a first receiver sequence E1, which contains a cyclical behavior with the stamped time response IfActive, and a second receiver sequence E2, which comprises the IfActive behavior.

Figure 12:
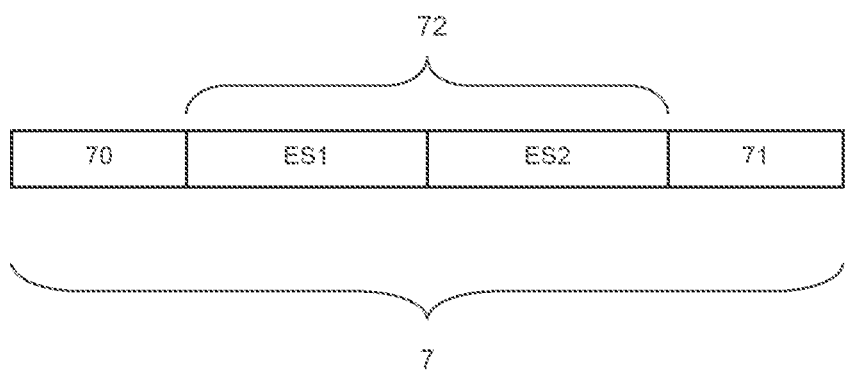

FIG. 12 shows a structure 7 of a message of the resulting signal. The message contains a message header 70 and a message end 71, both of which have data for "managing" a message. Furthermore, the message contains a data part 72 between the message header 70 and the message end 71, in which different receiver signals ES1, ES2 are contained. The data part can thus contain for example at point in time $t_1$, at which the first message sequence S1 transmits its informational signal and the second message sequence S2 sends its rest signal, the informational signal of the first message sequence S1 and the rest signal of the second message sequence. At point in time $t_2$, at which the second message sequence S2 gives the first message sequence S1 its time response, the data part can contain the informational signal of the first message sequence S1 and the informational signal of the second message sequence S2. At point in time $t_3$, at which the rest phase of the second message sequence is initiated, the data part can contain the informational signal of the first message sequence S1 and the informational signal of the last message of the active phase of the second message sequence S2.

The security message is thus placed analogously to the transmission of a single message sequence, whereby an attack can be prevented. During the monitoring of a complete message, the separation into signal components does not take place if no signal within the concerned message changes during the active phase and if applicable the repetition phase (including security mark).

The disclosure is not limited to the exemplary embodiments described here. There is leeway for different adjustments and modifications, which a person skilled in the art would consider as also belonging to the disclosure based on their technical knowledge. For example, the described transmission method could also be used in other bus systems besides the CAN bus.

All examples mentioned here as well as formulations should be understood without limitation as specially listed examples. For example, experts acknowledge that the block diagram shown here represents a conceptual view of an exemplary circuit arrangement. In a similar manner, the flow charts and the like shown should be understood as different variants of the representation of processes, which can mainly be saved in computer-readable media and can thus be executed by a computer or processor.

It is understood that the suggested methods and the associated devices can be implemented in different forms of hardware, software, firmware, special processors or a combination of these. Special processors can comprise application-specific, integrated circuits (ASICs), computers with a reduced instruction set (RISC) and/or integrated circuits of digital technology (Field Programmable Gate Arrays—FPGAs). The software can be installed as an application program on a program memory device. The hardware can have for example one or more central units (CPU) and/or one or more memories as well as a random access memory (RAM) and/or one or more input/output (I/O) interface(s).

REFERENCE LIST

1 CAN bus system
2 Power train
3 Engine control
4a ABS control unit
4b Navigation unit
4c Light switch
4d Control unit for electronic stability control
5 Method for transmitting a message via the CAN bus
50 Transmission of informational messages
51 Transmission of a security message
52 Transmission of messages with rest content
6 Method for detecting an attack
60 Receiving a message sequence transmitted via the CAN bus
61 Checking the security message
62 Detecting an attack
7 Message
70 Message header
70 Message end
72 Data part
AP Active phase
RP Rest phase
BZ Information transmission cycle time (short cycle time)

RZ Rest cycle time (long cycle time)
$P_1$, $P_2$, $P_3$, $P_C$ Informational messages
$P_A$ Infiltrated informational message
$P_R$, $P_{Radd}$ Messages with rest content
$P_{AR}$ Infiltrated message with rest content
$P_S$ Security message
S1, S2 Message sequences
E1, E2 Receiver sequence
ES1, ES2 Received signal
$t_1$, $t_2$, $t_3$ Points of time

What is claimed is:

1. A method for transmitting a message sequence by a component via a data bus of a Controller Area Network (CAN) of a vehicle, comprising:
   transmit, via the data bus and during an active phase of the component, one or more informational messages, each containing an informational signal;
   transmit, via the data bus, a security message indicating an initiating of a rest phase of the component; and
   transmit, via the data bus and during a rest phase of the component, one or more rest messages, each containing a rest signal, at an interval of a rest cycle time during the rest phase;
   wherein the rest phase of the component begins subsequent the transmitting of the security message and subsequent the active phase of the component;
   wherein each of the informational signals and each of the rest signals differ from each other;
   wherein the security message and each of the one or more rest messages differ from each other;
   wherein the security message has a signal content, which corresponds to an informational signal of one of the one or more informational messages, which were transmitted during the active phase directly preceding the rest phase; and
   wherein the transmitting of the messages is completed with a signal send type corresponding to IfActive or IfActiveWithRepetition.

2. The method according to claim 1, wherein the transmitting of the one or more information messages comprises transmitting two or more informational messages at an interval of an information transmission cycle time; wherein the interval of the information transmission cycle time is shorter than the interval of the rest cycle time.

3. The method according to claim 1, wherein the security message's signal content corresponds to the informational signal of the informational message which was last transmitted during the active phase directly preceding the rest phase.

4. The method according to claim 1, further comprising:
   transmitting, via the data bus and during the rest phase of the component, a further rest message containing rest content; wherein the transmitting of the further rest message is at an interval that is less than the interval of the rest cycle time.

5. The method according to claim 1, wherein the one or more informational messages and the one or more rest messages each have an additional signal, which is an informational signal of a message sequence, which is transmitted with a signal send type, which differs from a signal send type of the message sequence to be transmitted via the data bus.

6. A device for transmitting a message sequence via a data bus of a Controller Area Network (CAN) of a vehicle, the device comprising:
   a memory; and
   a hardware processor configured to:
   transmit, via the data bus and during an active phase of the device, one or more informational messages, each containing an informational signal;
   transmit, via the data bus, a security message indicating an initiating of a rest phase of the device; and
   transmit, via the data bus and during the rest phase of the device, one or more rest messages, each containing a rest signal, at the interval of a rest cycle time during the rest phase;
   wherein the rest phase of the device begins subsequent the transmitting of the security message and subsequent the active phase of the device;
   wherein each of the informational signals and each of the rest signals differ from each other;
   wherein the security message and each of the one or more rest messages differ from each other;
   wherein the security message has a signal content, which corresponds to an informational signal of one of the one or more informational messages, which were transmitted during the active phase directly preceding the rest phase; and
   wherein the transmitting of the messages is completed with a signal send type corresponding to IfActive or IfActiveWithRepetition.

7. The device of claim 6, wherein the processor is further configured to:
   transmit two or more informational messages at an interval of an information transmission cycle time; wherein the interval of the information transmission cycle time is shorter than the interval of the rest cycle time.

8. The device of claim 6, wherein the security message's signal content corresponds to the informational signal of the informational message which was last transmitted during the active phase directly preceding the rest phase.

9. The device of claim 6, wherein the processor is further configured to:
   transmit, via the data bus and during the rest phase of the device, a further rest message containing rest content wherein the transmitting of the further rest message is at an interval that is less than the interval of the rest cycle time.

10. The device of claim 6, wherein the one or more informational messages and the one or more rest messages each have an additional signal, which is an informational signal of a message sequence, which is transmitted with a signal send type, which differs from a signal send type of the message sequence to be transmitted via the data bus.

* * * * *